United States Patent
Fairbourn et al.

(10) Patent No.: US 8,708,646 B2
(45) Date of Patent: Apr. 29, 2014

(54) MCRALY ALLOY, METHODS TO PRODUCE A MCRALY LAYER AND A HONEYCOMB SEAL

(75) Inventors: David Fairbourn, Sandy, UT (US); Paul Mathew Walker, Dunholme (GB)

(73) Assignee: Siemens Aktiengesellschaft, Munich (DE)

( * ) Notice: Subject to any disclaimer, the term of this patent is extended or adjusted under 35 U.S.C. 154(b) by 204 days.

(21) Appl. No.: 12/920,468

(22) PCT Filed: Jan. 23, 2009

(86) PCT No.: PCT/EP2009/050743
§ 371 (c)(1),
(2), (4) Date: Dec. 8, 2010

(87) PCT Pub. No.: WO2009/109414
PCT Pub. Date: Sep. 11, 2009

(65) Prior Publication Data
US 2011/0101619 A1    May 5, 2011

(30) Foreign Application Priority Data
Mar. 4, 2008 (EP) .................................... 08003968

(51) Int. Cl.
*B32B 3/12* (2006.01)
*B32B 15/00* (2006.01)
*F16J 15/453* (2006.01)
*F01D 11/12* (2006.01)
*C22C 38/18* (2006.01)
*C22C 9/05* (2006.01)

(52) U.S. Cl.
USPC ........ 415/173.5; 277/414; 428/593; 428/610; 428/678; 148/537; 427/383.7

(58) Field of Classification Search
None
See application file for complete search history.

(56) References Cited

U.S. PATENT DOCUMENTS

| | | | |
|---|---|---|---|
| 3,542,530 A | 11/1970 | Talboom, Jr. et al. | |
| 3,741,791 A | 6/1973 | Maxwell et al. | |
| 3,880,550 A * | 4/1975 | Corey et al. ................ | 415/173.4 |
| 4,080,486 A | 3/1978 | Walker et al. | |
| 4,664,973 A * | 5/1987 | Otfinoski et al. .......... | 428/307.3 |
| 4,867,639 A * | 9/1989 | Strangman ................. | 415/173.4 |
| 4,933,239 A * | 6/1990 | Olson et al. ................... | 428/557 |
| 5,080,934 A * | 1/1992 | Naik et al. .................... | 427/271 |
| 5,385,760 A * | 1/1995 | Schassberger et al. .... | 427/443.1 |
| 5,645,893 A * | 7/1997 | Rickerby et al. ............. | 427/405 |
| 5,763,107 A * | 6/1998 | Rickerby et al. ............. | 428/623 |
| 6,024,792 A | 2/2000 | Kurz et al. | |
| 6,129,991 A * | 10/2000 | Warnes et al. ................ | 428/610 |
| 6,485,025 B1 * | 11/2002 | Hammersley et al. ........ | 277/414 |
| 6,585,864 B1 * | 7/2003 | Fisher et al. ............. | 204/192.16 |

(Continued)

FOREIGN PATENT DOCUMENTS

| | | |
|---|---|---|
| EP | 0412397 B1 | 2/1991 |
| EP | 0 486 489 B1 | 5/1992 |

(Continued)

*Primary Examiner* — John J Zimmerman

(57) ABSTRACT

A MCrAlY alloy, methods to produce a MCrAlY layer and a honeycomb seal are provided. The MCrAlY alloy includes chromium, aluminum, yttrium and iron and optionally titanium, hafnium or silicon. The honeycomb seal includes a substrate, honeycomb cells and a protective coating on side walls of the honeycomb cells or a diffusion area inside side walls of the honeycomb cells, the protective coating or the diffusion area including the MCrAlY alloy.

19 Claims, 3 Drawing Sheets

(56) References Cited

U.S. PATENT DOCUMENTS

| | | | |
|---|---|---|---|
| 6,884,470 B2* | 4/2005 | Gorman | 427/448 |
| 8,187,717 B1* | 5/2012 | Xie et al. | 428/472 |
| 2001/0052375 A1* | 12/2001 | Sievers et al. | 148/516 |
| 2001/0053410 A1* | 12/2001 | Fernihough et al. | 427/142 |
| 2002/0035034 A1* | 3/2002 | Wieres | 502/302 |
| 2003/0000675 A1 | 1/2003 | Fried et al. | |
| 2003/0019914 A1* | 1/2003 | Karl et al. | 228/181 |
| 2003/0072879 A1 | 4/2003 | Fournes et al. | |
| 2003/0077477 A1* | 4/2003 | Bruce et al. | 428/632 |
| 2004/0213919 A1* | 10/2004 | Fried | 427/455 |
| 2004/0247926 A1* | 12/2004 | Berkeley et al. | 428/593 |
| 2005/0076644 A1* | 4/2005 | Hardwicke et al. | 60/772 |
| 2005/0214564 A1* | 9/2005 | Subramanian | 428/633 |
| 2007/0077362 A1* | 4/2007 | Ruzzo et al. | 427/446 |
| 2007/0116870 A1 | 5/2007 | Dettling et al. | |
| 2008/0135602 A1* | 6/2008 | Meier | 228/176 |
| 2011/0074113 A1* | 3/2011 | Cavanaugh et al. | 277/414 |
| 2012/0126485 A1* | 5/2012 | Fairbourn et al. | 277/414 |

FOREIGN PATENT DOCUMENTS

| | | |
|---|---|---|
| EP | 0786017 B1 | 7/1997 |
| EP | 0892090 A1 | 1/1999 |
| EP | 1204776 B1 | 5/2002 |
| EP | 1254968 | 11/2002 |
| EP | 1306454 A1 | 5/2003 |
| EP | 1319729 A1 | 6/2003 |
| GB | 2214523 A | 9/1989 |
| GB | 2421032 A | 6/2006 |
| WO | WO 9967435 A1 | 12/1999 |
| WO | WO 0044949 A1 | 8/2000 |
| WO | WO 0078431 A1 | 12/2000 |
| WO | WO 0172455 A1 | 10/2001 |
| WO | WO 0220197 A1 | 3/2002 |
| WO | WO 0242610 A2 | 5/2002 |

* cited by examiner

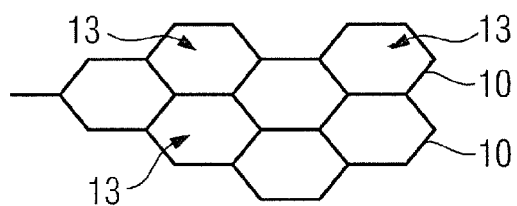
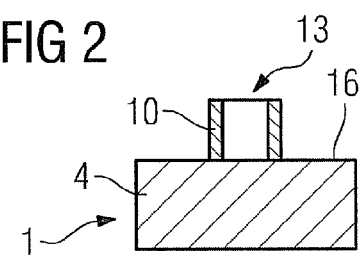
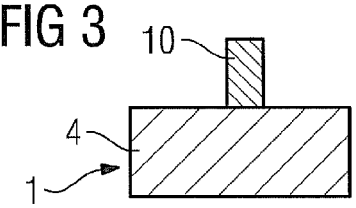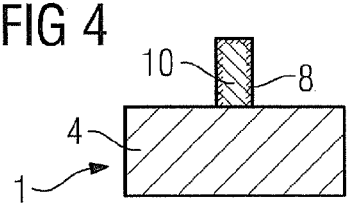
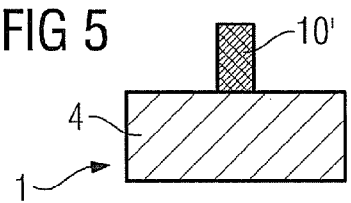
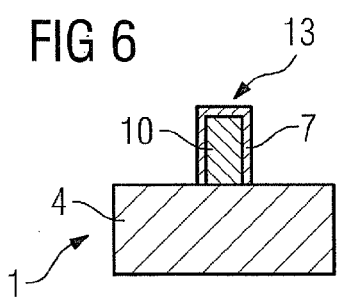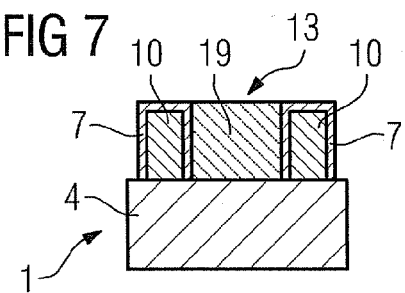

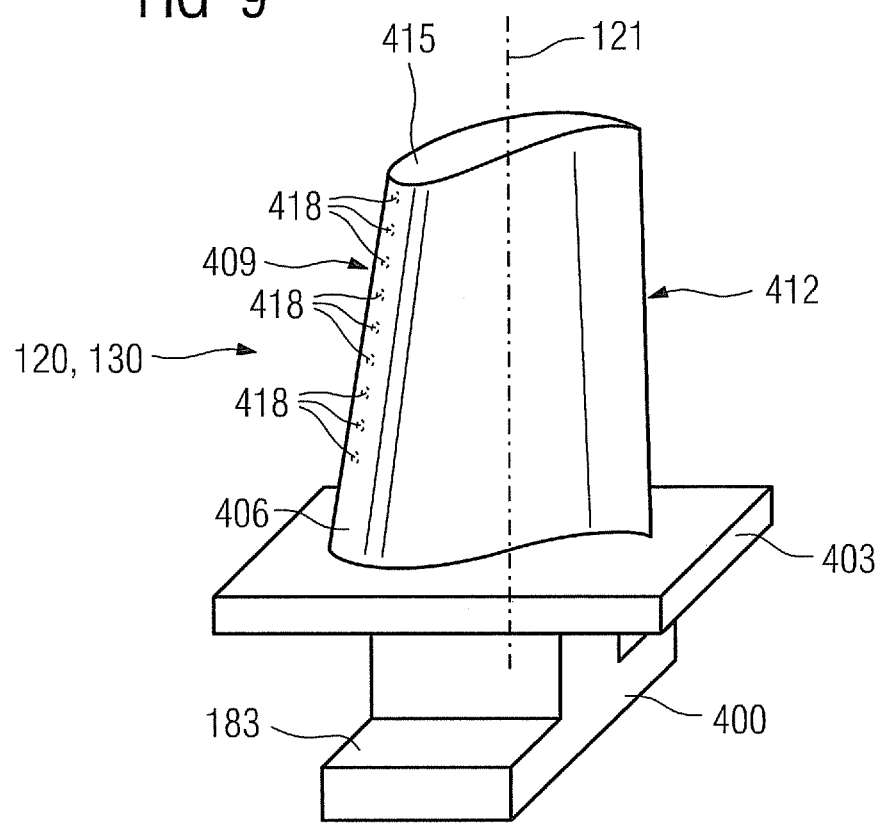

MCRALY ALLOY, METHODS TO PRODUCE A MCRALY LAYER AND A HONEYCOMB SEAL

CROSS REFERENCE TO RELATED APPLICATIONS

This application is the US National Stage of International Application No. PCT/EP2009/050743 filed Jan. 23, 2009, and claims the benefit thereof. The International Application claims the benefits of European Application No. 08003968.8 EP filed Mar. 4, 2008. All of the applications are incorporated by reference herein in their entirety.

FIELD OF INVENTION

The invention relates to a MCrAlY alloy, methods to produce a MCrAlY layer and a honeycomb seal.

BACKGROUND OF INVENTION

Substrates are often coated with a protective layer because the material of the substrate does not offer good oxidation or corrosion resistance. By contrast the coatings have good corrosion resistance but not good mechanical properties.

Both gas turbine and jet engine manufacturers must seal and isolate certain sections of an engine thereby controlling the passages of gases through a modern engine. It is well known to produce seals between sections by impressing a sharpened part feature called a seal tooth into a very crushable opposing part called a honeycomb seal.

The materials used for the honeycomb seals are selected to maintain their ability to be crushed by the sharp seal tooth. These seals are generally made of numerous pockets with six side walls similar to the pattern of honeycombs in nature. They are skived into layers about 0.2" thick (0.6 cm) and then laid into a curved piece to fit around the engine. These pieces are called shrouds. To hold the honeycomb in, it has been the practice to braze the hexagonal shaped seal material into a shroud pocket.

To improve the life of the seals, some engine manufacturers also fill the small hexagonal pockets with abradable materials and then braze this into the shroud as well. Honeycomb seals also undergo corrosion and oxidation, which decreases the life time of the component.

These seals work acceptably well and have been in use for a number of years. As the sulfur levels have increased in fuels and harder damage has occurred to the seals during engine operation. The mechanism of damage has been shown to be hot corrosion enhanced by the sulfur levels in the fuels.

There exists a need for a more corrosion/oxidation resistant material to fabricate the cells from. FeCrAlY has been shown to be very hot corrosion/oxidation resistant but nearly impossible to fabricate. For the thin sheets which are needed to form the sidewall of the hexagonal shapes FeCrAlY is too brittle. During manufacturing it may shatter. Hence, while this material is acceptable from the corrosion/oxidation point of view it is not acceptable from difficulties during the metal fabrication.

SUMMARY OF INVENTION

It is an object of the invention to solve the problem given above and to provide a MCrAlY alloy, methods to produce a MCrAlY layer and a honeycomb seal.

The problem is solved by a MCrAlY alloy, methods to produce a MCrAlY layer and an honeycomb seal according to the independent claims.

In the dependent claims further embodiments of the invention are listed which can be combined arbitrarily with each other in order to get additional advantages.

BRIEF DESCRIPTION OF THE DRAWINGS

The drawings include the following:
FIG. 1 shows honeycomb cells,
FIG. 2, 3, 4, 5, 6, 7 show some embodiments of a honeycomb seal with a coating,
FIG. 8. shows a gas turbine, and
FIG. 9. shows a turbine blade in a perspective view.
The figures and the description are only embodiments of the invention.

DETAILED DESCRIPTION OF INVENTION

Figure 8:
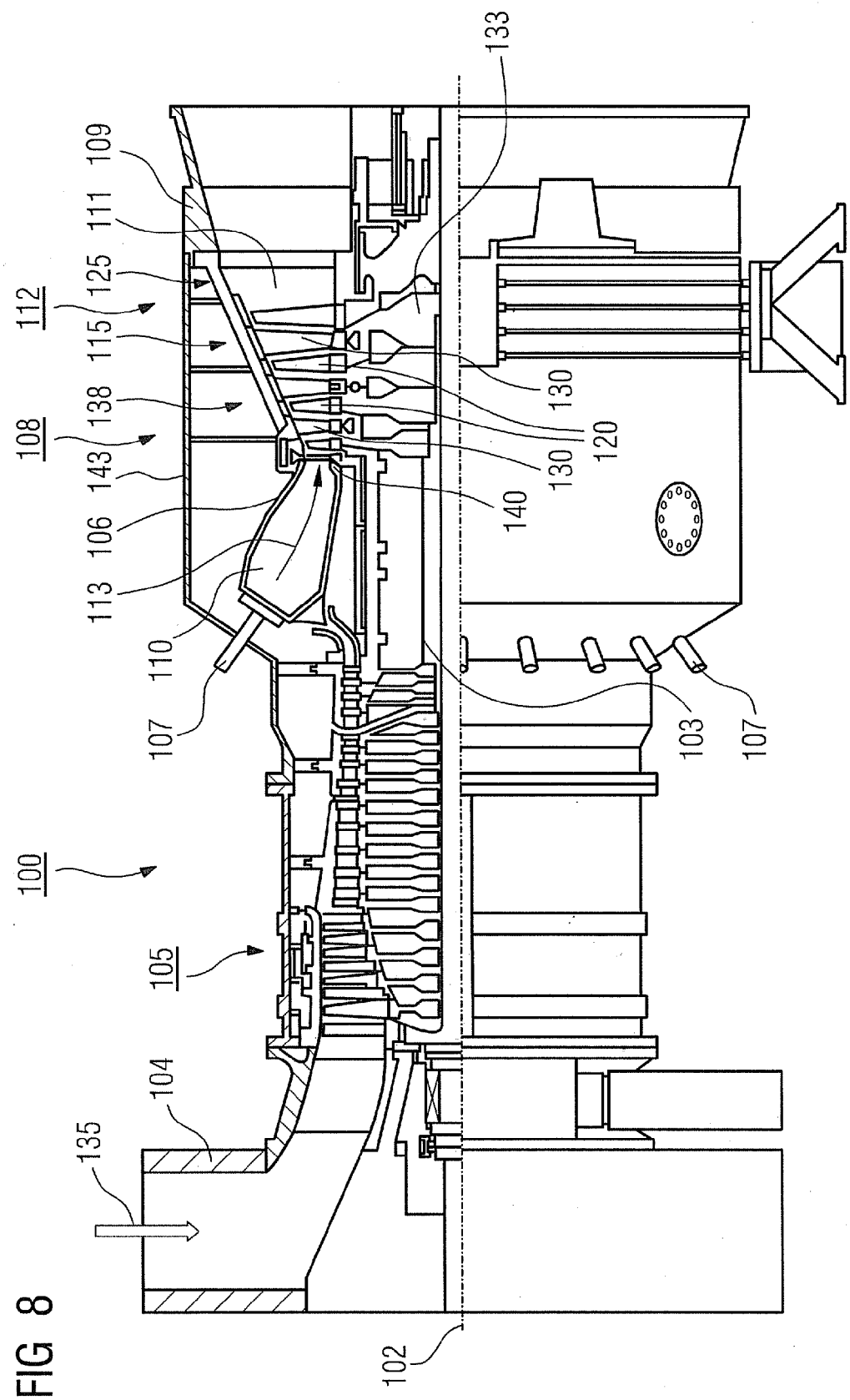

FIG. 1 shows several honeycomb cells 13 which have preferably the geometry of a honeycomb (hexagonal). Such a honeycomb cell 13 consists of six side walls 10, wherein two honeycomb cells 13 have a common side wall 10 in the arrangement of FIG. 1 if used as seal 1 (FIG. 2).

In FIG. 2 a partial cross section of a substrate 4 with one honeycomb cell 13 is shown, which form a honeycomb seal 1. Onto a substrate 4 (shroud) of the honeycomb seal 1 the honeycomb cells 13 with the side walls 10 are brazed (braze not shown). This can be done preferably by applying a brazing layer on the surface 16 of the substrate 4 or applying a braze on the undersides of the side walls 10.

The sidewalls 10 comprise a M-base metallic material, especially steel or stainless steel, especially 1010 steel.

This steel (as an exemplary example) is then exposed to alloying elements Cr, Al and Y (FIG. 3) to form by diffusion a MCrAlY, here a MCrAlY diffusion area 8 inside the side wall 10 (FIG. 3→FIG. 4). The diffusion area 8 is only a part of the side wall 10.

The diffusion can preferably also be throughout the wall (FIG. 3→FIG. 5). This means that nothing of the original sidewall is left. The sidewall 10' consists of a MCrAlY, especially of a FeCrAlY alloy.

Preferably first chromium can be deposited, followed by deposition of aluminum, especially doped with Yttrium (Y).

Aluminizing can be performed preferably by the well known pack cementation process or other methods. Preferably Yttrium is coated together with aluminum.

Preferably other alloying elements like Hafnium, titanium or silicon can be added.

The alloying elements are preferably exposed to the substrate by a vapour process, preferably by CVD. During exposure the elements can be used together or one by one.

Since iron is recognized as a getter for aluminum at least, then the addition of a thick aluminide coating or a thick chromide coating followed by an aluminide coating could be tailored to provide the correct chemistry to meet the composition of FeCrAlY inside the diffusion area (8).

After a following heat treatment for diffusion, a relative soft and ductile 1010 steel of a honeycomb seal was converted into a relatively brittle FeCrAlY via CVD.

The amount of Cr, Al and Y to be diffused into the substrate depends on the amount of Cr, Al (other base elements) already present in the substrate, especially the steel or Fe-based material. This can be controlled by exposure time, temperature and concentration.

EXAMPLES

A:
1. providing a substrate 4 with honeycomb cells 13
2. aluminizing
3. optionally a heat treatment to promote diffusion of Al in substrate
4. chromizing
5. optionally a heat treatment to promote diffusion of Cr in Al and into substrate B:
1. providing a substrate 4 with honeycomb cells 13
2. aluminizing
3. chromizing
4. a heat treatment to promote diffusion of Cr, Al C:
1. providing a substrate 4 with honeycomb cells 13 and with a braze between honeycomb 13 cells and substrate 4
2. chromizing
3. aluminizing
4. optionally a heat treatment to promote diffusion of Cr, Al D:
1. providing a substrate 4 with honeycomb cells 13 and with a braze between honeycomb 13 cells and substrate 4
2. aluminizing
3. chromizing
4. optionally a heat treatment to promote diffusion of Cr, Al E:
1. providing a substrate 4 with honeycomb cells 13
2. chromizing
3. aluminizing
4. a heat treatment to promote diffusion of Cr, Al F:
1. providing a substrate 4 with honeycomb cells 13
2. chromizing
3. optionally a heat treatment to promote diffusion of Al in substrate
4. aluminizing
5. optionally a heat treatment to promote diffusion of Cr in Al and into substrate The brazing is preferably accomplished simultaneously with the coating process of the coating 7 (FIG. 6) or of the diffusion area 8 (FIG. 4, 5). That means the heat treatment of the brazing procedure is included in the heating during coating or exposure or a following heat treatment.

By this sequence the advantage of a ductile and easily to be manufactured steel can be used to form the honeycomb cells and adapt it into shrouds. After that a reduced ductility is not a problem anymore because no further bending or mechanical stresses due to manufacturing are induced.

According to another example of the invention a protective MCrAlY coating 7 is applied on the sidewalls 10 (FIG. 6). Preferably the coating 7 is applied on the honeycomb cells 13 after brazing the honeycomb cells 13 on the substrate 4, so that the braze is also protected by the coating 7.

The composition of the coating 7 or diffusion area 8 comprises chromium, aluminum (Al) and yttrium (Y) and balance M, especially iron (Fe). Especially the FeCrAlY alloy or coating 7 consists of Fe, Cr, Al and Y.

Optionally the MCrAlY alloy or coating 7 can contain titanium (Ti), Hafnium (Hf), and/or silicon (Si) which enhance the corrosion/oxidation behavior of the alloyed or coated steel. Hafnium (Hf) stabilizes the aluminum oxide which is formed on the outside surface of the MCrAlY alloy wherein silicon (Si) will permit the formation of an aluminum silicate phase.

The phrase "contain" means that the amount of such an element is at least two times higher that the impurity level of this element in a MCrAlY alloy or at least two times higher than the measuring accuracy depending on which is higher.

Especially the MCrAlY alloy or coating 7 consists of Fe, Cr, Al, Y and at least one element of the group Ti, Hf and/or Si.

Preferred ranges of the elements (in wt %) are 18% to 35% Cr, 3% to 15% Al, 0.2% to 2% Yttrium and for the optional additions up to 3% titanium, up to 3% hafnium and/or up to 3% silicon.

Adding the low side, the balance would be M, especially iron 80% by weight, and on the high side 39% by weight.

All combinations with the optional elements are preferred embodiments:
That means: MCrAlY
+Ti
+Hf
+Si
+Ti+Hf
+Ti+Si
+Hf+Si
+Ti+Hf+Si.

These seven combinations of the elements of the alloy can be on exclusive (consist) or non-exclusive (comprise) listing of the MCrAlY or coating 7.

The FeCrAlY coating 7 or diffusion area 8 preferably does not contain nickel (Ni) and/or does not contain cobalt (Co).

The MCrAlY coating 7 can be applied by a coating or exposure process known in the state of the art by using the adequate alloy of MCrAlY or preferably by coating the elements Cr, Al and Y and/or the optional elements separately and forming by diffusion this MCrAlY diffusion area.

Especially, a CVD coating process is used to coat the honeycomb cells 13 of the honeycomb seals 1.

Especially, the honeycomb cell 13 can be filled with an abradable material, especially a ceramic 19 in order to have a further improvement of the abrasion behavior of the honeycomb seal 1 (FIG. 7).

The material of the side walls 10 of the honeycomb cells 1 is preferably steel or stainless steel.

The best results with the diffusion areas 8 were got with a iron based substrate to obtain a FeCrAlY alloy.

FIG. 8 shows, by way of example, a partial longitudinal section through a gas turbine 100. In the interior, the gas turbine 100 has a rotor 103 which is mounted such that it can rotate about an axis of rotation 102, has a shaft and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133. A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield bricks which line the annular combustion chamber 110, are subject to the highest thermal stresses. To be able to withstand the temperatures which prevail there, they can be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloys.

The guide vane 130 has a guide vane root (not shown here) facing the inner housing 138 of the turbine 108 and a guide vane head at the opposite end from the guide vane root. The guide vane head faces the rotor 103 and is fixed to a securing ring 140 of the stator 143.

FIG. 9 shows a perspective view of a rotor blade 120 or guide vane 130 of a turbo machine, which extends along a longitudinal axis 121. The turbo machine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 as well as a blade or vane tip 415.

As a guide vane 130, the vane 130 may have a further platform (not shown) at its vane tip 415. A blade or vane root 183, which is used to secure the rotor blades 120, 130 to a shaft or disk (not shown) is formed in the securing region 400. The blade or vane root 183 is designed, for example, in hammerhead farm. Other configurations, such as a fir-tree or dovetail root, are possible. The blade or vane 120, 130 have a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy.

The blade or vane 120, 130 may in this case be produced by a casting process, also by means of directional solidification, by a forging process, by a milling process or combinations thereof.

Work pieces with a single-crystal structure or structures are used as components for machines which, in operation, are exposed to high mechanical, thermal and/or chemical stresses.

Single-crystal work pieces of this type are produced, for example, by directional solidification from the melt. This involves casting processes in which the liquid metallic alloy solidifies to form the single-crystal structure, i.e. the single-crystal work piece, or solidifies directionally.

In this case, dendritic crystals are oriented along the direction of heat flow and form either a columnar crystalline grain structure (i.e. grains which run over the entire length of the work piece and are referred to here, in accordance with the language customarily used, as directionally solidified) or a single-crystal structure, i.e. the entire work piece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general tetras to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1; these documents form part of the disclosure with regard to the solidification process.

The blades or vanes 120, 130 may likewise have coatings protecting against corrosion or oxidation, e.g. MCrAlX (M is at least one element selected from the group consisting of iron (Fe), cobalt (Co), nickel (Ni), X is an active element and represents yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

The density is preferably 95% of the theoretical density.

A protective aluminum oxide layer (TGO=thermally grown oxide layer) forms on the MCrAlX layer (as an intermediate layer or an outermost layer).

It is also possible for a thermal barrier coating, consisting for example of $ZrO_2$, $Y_2O_3$—$ZrO_2$, i.e. unstabilized, partially stabilized or fully stabilized by yttrium oxide and/or calcium oxide and/or magnesium oxide, which is preferably the outermost layer, to be present on the MCrAlX.

The thermal barrier coating covers the entire MCrAlX layer. Columnar grains are produced in the thermal barrier coating by means of suitable coating processes, such as for example electron beam physical vapor deposition (EB-PVD).

Other coating processes are conceivable, for example atmospheric plasma spraying (APS), LPPS, VPS or CVD. The thermal barrier coating may include porous grains which have micro cracks or macro cracks for improving its resistance to thermal shocks. The thermal barrier coating is therefore preferably more porous than the MCrAlX layer.

The blade or vane 120, 130 may be hollow or solid in form. If the blade or vane 120, 130 is to be cooled, it is hollow and may also have film-cooling holes 418 (indicated by dashed lines).

The invention claimed is:

1. A MCrAlY alloy, comprising (in wt%):
   an M-based metallic substrate configured to define part of a honeycomb seal;
   Cr and Al and Y material applied to the substrate; and
   a diffusion zone within the M-based metallic substrate and comprising MCrAlY formed by diffusion of the Cr and Al and Y into the substrate, the MCrAlY comprising;
   18% - 35% chromium (Cr);
   3% - 15% aluminum (Al); and
   0.2% - 2% yttrium (Y),
   wherein M is iron (Fe)-,
   wherein the MCrAlY alloy comprises at least a first effective amount of hafnium (Hf) for enhancing an oxidation behavior of the alloy and/or at least a second effective amount of silicon (Si) for enhancing an oxidation behavior of the MCrAlY alloy.

2. The MCrAlY alloy according to claim 1, wherein M is iron (Fe) and wherein the alloy comprises 78.8% to 39% iron (Fe) depending on the amounts of wt% of the elements Cr, Al and Y.

3. The MCrAlY alloy according to claim 2, wherein the MCrAlY alloy forms honeycomb cells in a gas turbine engine blade shroud.

4. The MCrAlY alloy according to claim 1, wherein the alloy comprises a concentration of the titanium up to 3%.

5. The MCrAlY alloy according to claim 1, wherein the alloy comprises a concentration of the hafnium up to 3%.

6. The MCrAlY alloy according to claim 1, wherein the alloy comprises a concentration of the silicon up to 3%.

7. The MCrAlY alloy according to claim 1, wherein the first effective amount of hafnium (Hf) is effective to stabilize aluminum oxide which is formed on an outside surface of the MCrAlY alloy.

8. The MCrAlY alloy according to claim 1, wherein the second effective amount of Silicon (Si) is effective permit formation of an aluminum silicate phase.

9. A method to form a diffusion area inside a M-based metallic material, comprising:
   forming a honeycomb cell comprising an M-based metallic material; and
   obtaining the diffusion area comprising MCrAlY and within the M-based metallic material by exposing the honeycomb cell to alloying elements Cr, Al, and Y, wherein M is Ni, Co, or Fe,
   wherein at least a first effective amount of hafnium (Hf) and/or at least a second effective amount of silicon (Si) is diffused into the diffusion area for enhancing an oxidation behavior of the formed MCrAlY alloy.

10. The method according to claim 9, further comprising:
    brazing the honeycomb cells onto a substrate, wherein the diffusion area is obtained after the brazing.

11. The method according to claim 10, wherein the brazing is performed during the obtaining the diffusion area by exposing the M-based metallic material with at least one of the alloying elements Cr, Al, Y of a MCrAlY composition.

12. The method according to claim 9, wherein M consists of iron (Fe).

13. The method according to claim 9, wherein most of a thin wall of the honeycomb cells is diffused with the alloying elements.

14. The method according to claim 9, wherein a whole wall of the honeycomb cells is diffused throughout.

15. A honeycomb seal, comprising:
    an M-based metallic substrate forming honeycomb cells;
    Cr, Al, and Y applied to the substrate, and
    a diffusion zone inside side walls of the honeycomb cells, wherein the diffusion zone comprises an MCrAlY alloy,
    wherein the MCrAlY comprises:
    18% - 35% chromium (Cr);
    3% - 15% aluminum (Al); and
    0.2% - 2% yttrium (Y), and
    wherein the M in the M-based metallic substrate and in the MCrAlY alloy is iron (Fe),
    wherein the MCrAlY alloy comprises at least a first effective amount of hafnium (Hf) for enhancing an oxidation behavior of the alloy and/or at least a second effective amount of silicon (Si) for enhancing an oxidation behavior of the MCrAlY alloy.

16. The honeycomb seal according to claim 15, wherein the side walls of the honeycomb cells are made of steel.

17. The honeycomb seal according to claim 15, wherein the side walls of the honeycomb cells are made of stainless steel.

18. The honeycomb seal according to claim 15, wherein the first effective amount of hafnium (Hf) is effective to stabilize aluminum oxide which is formed on an outside surface of the MCrAlY alloy.

19. The honeycomb seal according to claim 15, wherein the second effective amount of Silicon (Si) is effective permit formation of an aluminum silicate phase.

* * * * *